United States Patent
Hofmann et al.

(10) Patent No.: US 7,475,904 B2
(45) Date of Patent: Jan. 13, 2009

(54) SIDE IMPACT RESTRAINT DEVICE

(75) Inventors: Sven Hofmann, Schwaebisch Gmuend (DE); Dominique Acker, Gschwend (DE)

(73) Assignee: TRW Automotive GmbH, Alfdorf (DE)

( * ) Notice: Subject to any disclaimer, the term of this patent is extended or adjusted under 35 U.S.C. 154(b) by 414 days.

(21) Appl. No.: 11/047,113

(22) Filed: Jan. 31, 2005

(65) Prior Publication Data

US 2005/0184493 A1    Aug. 25, 2005

(30) Foreign Application Priority Data

Feb. 25, 2004    (DE) ................. 10 2004 009 013

(51) Int. Cl.
  *B60R 21/276* (2006.01)
(52) U.S. Cl. .................. 280/739; 280/730.2
(58) Field of Classification Search .......... 280/730.1, 280/730.2, 739
  See application file for complete search history.

(56) References Cited

U.S. PATENT DOCUMENTS

| | | | | | |
|---|---|---|---|---|---|
| 3,573,885 | A | * | 4/1971 | Brawn et al. ............... | 280/739 |
| 3,887,213 | A | * | 6/1975 | Goetz ........................ | 280/738 |
| 4,111,458 | A | * | 9/1978 | Okada et al. ............... | 280/739 |
| 4,181,325 | A | * | 1/1980 | Barnett ...................... | 280/739 |
| 5,310,215 | A | * | 5/1994 | Wallner ..................... | 280/739 |
| 5,464,250 | A | * | 11/1995 | Sato ......................... | 280/743.1 |
| 5,556,128 | A | | 9/1996 | Sinnhuber et al. | |
| 5,669,628 | A | * | 9/1997 | Kaufmann et al. ......... | 280/739 |
| 5,839,755 | A | * | 11/1998 | Turnbull .................... | 280/739 |
| 5,890,732 | A | * | 4/1999 | Nakamura et al. ......... | 280/729 |
| 5,913,536 | A | * | 6/1999 | Brown ....................... | 280/730.2 |
| 5,924,721 | A | * | 7/1999 | Nakamura et al. ......... | 280/730.2 |
| 5,927,750 | A | * | 7/1999 | Nakamura et al. ......... | 280/730.2 |
| 5,938,231 | A | * | 8/1999 | Yamazaki ................. | 280/730.1 |
| 6,142,517 | A | * | 11/2000 | Nakamura et al. .......... | 280/739 |
| 6,170,860 | B1 | * | 1/2001 | Denz et al. ............... | 280/730.2 |
| 6,206,411 | B1 | * | 3/2001 | Sunabashiri .............. | 280/730.2 |
| 6,378,896 | B1 | * | 4/2002 | Sakakida et al. .......... | 280/730.2 |
| 6,547,276 | B2 | | 4/2003 | Heilig | |
| 6,554,313 | B2 | * | 4/2003 | Uchida ...................... | 280/729 |
| 6,648,367 | B2 | * | 11/2003 | Breed et al. .............. | 280/730.1 |
| 6,712,384 | B2 | * | 3/2004 | Abe ......................... | 280/730.1 |
| 6,783,151 | B2 | * | 8/2004 | Rasch et al. ................ | 280/729 |
| 6,851,706 | B2 | * | 2/2005 | Roberts et al. ........... | 280/730.1 |
| 6,883,831 | B2 | * | 4/2005 | Hawthorn et al. .......... | 280/739 |
| 6,932,386 | B2 | * | 8/2005 | Ikeda et al. ................ | 280/739 |

(Continued)

FOREIGN PATENT DOCUMENTS

DE    19714266    11/1997

(Continued)

*Primary Examiner*—Toan C To
*Assistant Examiner*—Barry Gooden, Jr.
(74) *Attorney, Agent, or Firm*—Tarolli, Sundheim, Covell & Tummino LLP

(57) ABSTRACT

A side impact restraint device for protection of an occupant (20a; 20b), sitting on a vehicle seat (10) in a motor vehicle, includes a gas bag (14). The gas bag (14) unfolds between a lateral structure (12) of the vehicle and the occupant (20a; 20b). The gas bag has an outflow opening (24) which is arranged in a region (26) of the gas bag (14) facing the occupant (20a: 20b). The vertical position of the outflow opening (24) is selected so that it is not covered by the upper body of a small occupant (20a).

10 Claims, 3 Drawing Sheets

U.S. PATENT DOCUMENTS

| | | | |
|---|---|---|---|
| 6,976,702 B2 * | 12/2005 | Yokota et al. | 280/730.2 |
| 7,108,278 B2 * | 9/2006 | Kai et al. | 280/730.2 |
| 7,118,127 B2 * | 10/2006 | Damm | 280/739 |
| 7,156,418 B2 * | 1/2007 | Sato et al. | 280/730.2 |
| 7,168,736 B2 * | 1/2007 | Tanase et al. | 280/730.2 |
| 2001/0017458 A1 | 8/2001 | Rothweiler et al. | |
| 2001/0035634 A1 * | 11/2001 | Breed | 280/730.2 |
| 2002/0047253 A1 * | 4/2002 | Rasch et al. | 280/728.2 |
| 2002/0096869 A1 * | 7/2002 | Kai et al. | 280/735 |
| 2003/0141709 A1 * | 7/2003 | Honda et al. | 280/730.2 |
| 2003/0168836 A1 * | 9/2003 | Sato et al. | 280/730.2 |
| 2003/0178831 A1 * | 9/2003 | Roberts et al. | 280/743.1 |
| 2004/0012179 A1 | 1/2004 | Pinsenschaum et al. | |
| 2004/0021304 A1 * | 2/2004 | Tanase et al. | 280/729 |
| 2004/0056456 A1 * | 3/2004 | Ikeda et al. | 280/730.2 |
| 2004/0056459 A1 * | 3/2004 | Kassman et al. | 280/739 |
| 2004/0119269 A1 * | 6/2004 | Yokota et al. | 280/730.2 |
| 2004/0124615 A1 * | 7/2004 | Tanase et al. | 280/730.2 |
| 2004/0130127 A1 * | 7/2004 | Kurimoto et al. | 280/729 |
| 2004/0256842 A1 * | 12/2004 | Breed | 280/730.1 |
| 2004/0256845 A1 * | 12/2004 | Damm | 280/739 |
| 2005/0184493 A1 * | 8/2005 | Hofmann et al. | 280/730.2 |
| 2006/0012155 A1 * | 1/2006 | Shaner et al. | 280/730.2 |
| 2006/0202452 A1 * | 9/2006 | Breed et al. | 280/730.2 |
| 2006/0220358 A1 * | 10/2006 | Umehara | 280/730.2 |
| 2006/0261579 A1 * | 11/2006 | Breed | 280/729 |
| 2007/0057492 A1 * | 3/2007 | Feller et al. | 280/730.2 |

FOREIGN PATENT DOCUMENTS

| | | |
|---|---|---|
| DE | 19633883 | 2/1998 |
| DE | 29804005 | 8/1998 |
| DE | 29906477 | 9/1999 |
| DE | 20000144 | 6/2000 |
| DE | 10018170 | 10/2001 |
| DE | 10020729 | 10/2001 |
| DE | 10032791 | 1/2002 |
| DE | 102004004544 | 8/2005 |
| DE | 102004006185 | 9/2005 |
| EP | 0670247 | 9/1995 |
| EP | 1044855 | 12/2003 |
| FR | 2805505 | 8/2001 |

* cited by examiner

US 7,475,904 B2

SIDE IMPACT RESTRAINT DEVICE

BACKGROUND OF THE INVENTION

The invention relates to a side impact restraint device for the protection of an occupant sitting on a vehicle seat in a motor vehicle.

From published German Patent Application DE 197 14 266 A1 a side impact restraint device is known with a gas bag which unfolds between a lateral structure of the vehicle and the occupant. The gas bag has two sections of differing width. The narrower upper section of the gas bag extends at the level of the chest region; the wider lower section extends at the level of the pelvic region.

Published Germ an Patent Application DE 100 20 729 A1 shows a gas bag which preferably unfolds from a vehicle seat and has outflow openings enabling a controlled escaping of the gas in case of an impact.

It is an object of the invention to provide a side impact restraint device with a gas bag which adapts itself to the physique of the occupant.

SUMMARY OF THE INVENTION

According to the invention a side impact restraint device in which the gas bag has an outflow opening which is arranged in a region of the gas bag facing the occupant, the vertical position of the outflow opening being selected so that it is not covered by the upper body (torso) of a small occupant. The arrangement of the outflow opening according to the invention causes the outflow opening to be covered by large occupants, so that a comparatively high internal pressure results, whereas in the case of small occupants the outflow opening is exposed, so that a comparatively low internal pressure is produced. The outflow opening therefore makes possible an individual adaptation of the restraint effect with the physique of the occupant.

Optimum test results are produced for an outflow opening which is located in a region which, in relation to the hip joint of the occupant, extends between a height of 400 mm and a height of 550 mm.

According to an advantageous embodiment of the invention, the gas bag has a further outflow opening which is arranged in a region of the lower section of the gas bag not facing the occupant. This, in any case, exposed outflow opening makes provision that the gas bag shape and the gas bag internal pressure can also adapt themselves individually to the physique of large occupants.

In order to prevent the gas emerging from the outflow opening from directly hitting the occupant, it is expedient to provide on the second outflow opening an arrangement for deflecting the outflowing gas.

According to a preferred embodiment of the invention, the gas bag in the inflated state, viewed in longitudinal direction of the vehicle, has an upper section and a lower section widened compared with the upper section, the lower section extending solely above the hip joint of the occupant. The widened design of the lower gas bag section, in particular in the case of occupants with a narrow upper body, makes provision that the gap between door lining and upper body is closed as quickly as possible. Accordingly, the restraint effect with such occupants begins earlier and is thereby carried out more effectively. Also with large occupants, in the case of a large distance between seat rest and door lining, the restraint effect can be improved compared with conventional cushion-shaped gas bags.

DETAILED DESCRIPTION OF THE INVENTION

Figure 1:
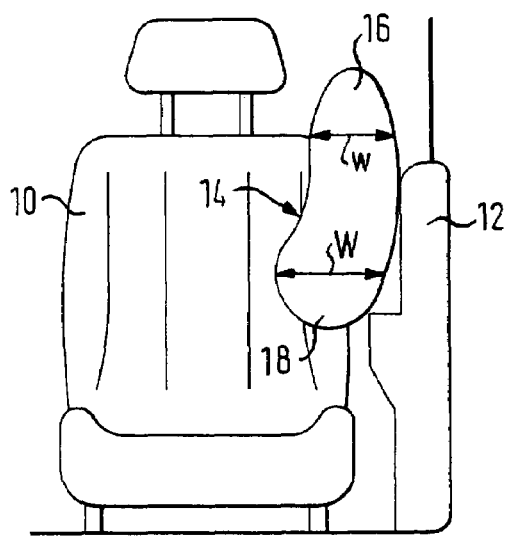
FIG. 1 shows a vehicle seat next to a lateral structure of a vehicle with an inflated gas bag of a side impact restraint device according to the invention, viewed in longitudinal direction of the vehicle.

In FIG. 1 a part of a vehicle interior is illustrated, including a front seat 10 and a lateral structure 12 of the vehicle. The distance between the rest of the seat 10 and the lateral structure 12 (door lining or B-column) generally varies between 60 and 140 mm. In addition, an inflated gas bag 14 is shown for protection of a vehicle occupant from a side impact, the gas bag 14 having unfolded out from the seat rest 10. The gas bag 14 has an upper section 16 and a lower section 18, the width W of the lower section 18 exceeding the width w of the upper section 16.

Figure 2A:
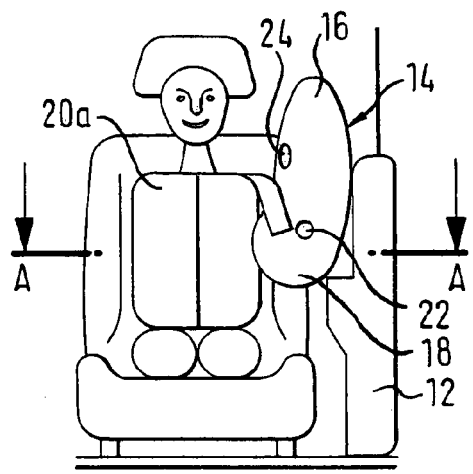
FIGS. 2a and 2b show the illustration of FIG. 1 with a small and a large vehicle occupant, respectively.
Figure 2B:
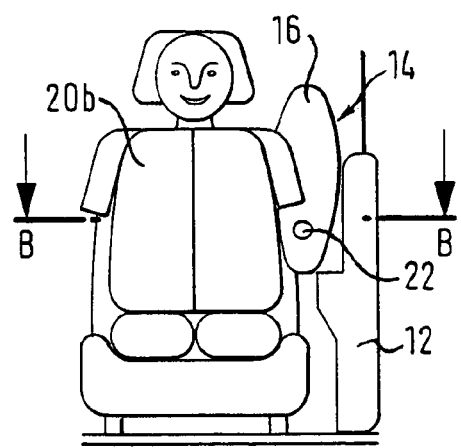

In the FIGS. 2a and 2b, a differentiation is made between a small occupant 20a with a narrow upper body and a large occupant 20b with a wide upper body. It can be seen that the lower section 18 of the gas bag 14, irrespective of the size of the occupant, extends at the height of the thorax region. Owing to the widened construction of the lower section 18, on unfolding of the gas bag 14, in particular in the case of small occupants 20a with a narrow upper body, the relatively large gap between upper body and lateral structure 12 is quickly closed.

The gas bag 14 has in addition two outflow openings 22 and 24 (see FIG. 2a). The first outflow opening 22 is arranged in a region of the gas bag 14 not facing the occupant, more precisely in the front region of the lower section 18. The second outflow opening 24 is provided in a region of the upper section 16 of the gas bag 14 facing the vehicle occupant.

Figure 5:
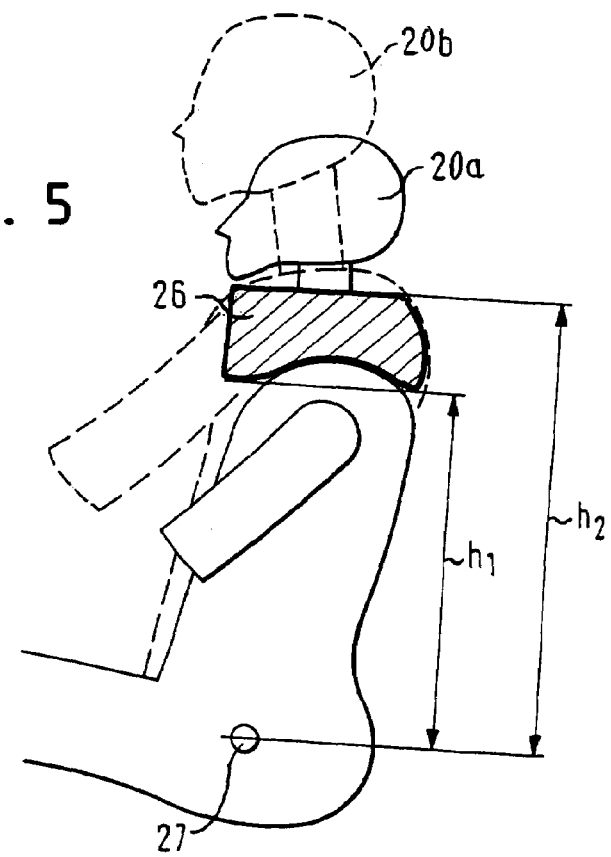
FIG. 5 shows a superimposed illustration of a small and a large seated occupant in side view.
Figure 4A:
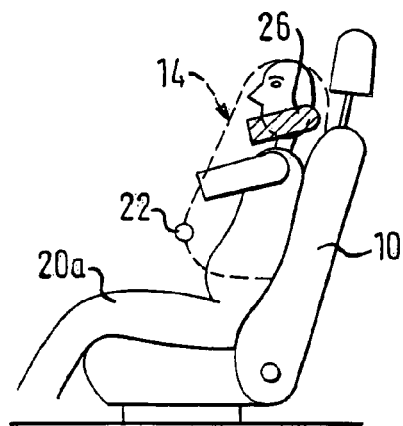
FIGS. 4a and 4b show the illustrations of FIGS. 2a and 2b, respectively, in side view.
Figure 4B:
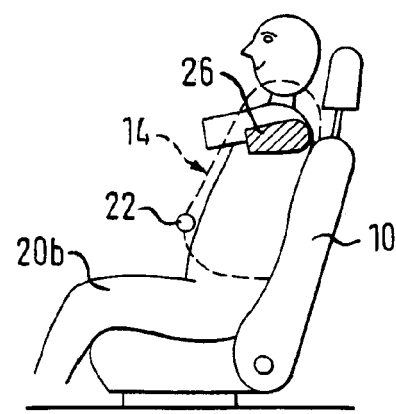

The vertical position of the second outflow opening 24 lies in a region 26, which is illustrated in hatched lines in FIGS. 4a, 4b and 5. This region 26, in relation to the hip joint 27 of an occupant 20a or 20b, extends between a height $h_1$ of 400 mm and a height $h_2$ of 550 mm.

From FIGS. 4a and 4b, it can further be seen that gas can always flow out from the first outflow opening 22 irrespective of the size of the occupant. On the other hand, the second outflow opening 24 is covered by large occupants 20b, whereas in the case of small occupants 20a, it remains free initially.

Figure 3A:
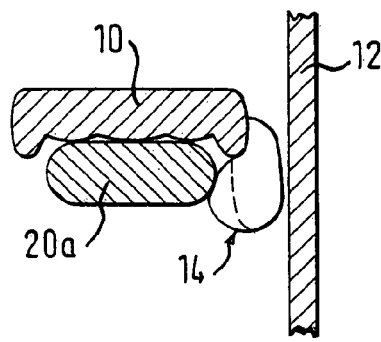
FIGS. 3a and 3b show sectional views along the lines A-A and B-B of FIGS. 2a and 2b, respectively.
Figure 3B:
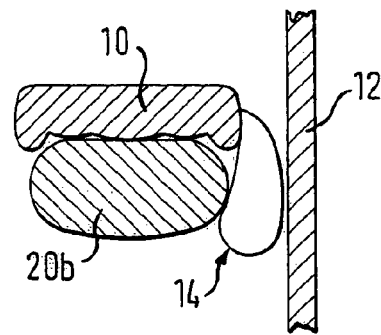

The first outflow opening 22 serves for adjusting the gas bag internal pressure specifically for large occupants 20b with a wide upper body. The possibility of gas emerging from the first outflow opening 22 allows a portion of the widened lower section 18 of the gas bag 14 to be able to be displaced (see FIGS. 2b and 3b). It has been found that for such occupants, a dynamic gas bag internal pressure of approximately 0.6 to 0.8 bar is optimal. In the case of small occupants 20a with a narrow upper body, the gas bag 14 substantially reaches its full expansion (see FIGS. 2a and 3a). As the second outflow opening 24 is not covered by a small occupant 20a, in this case the areas of the two outflow openings 22 and 24 are added up. Through the outflowing of gas from both outflow openings 22 and 24, an optimum dynamic gas bag internal pressure of approximately 0.3 to 0.4 bar for small occupants results. The gas bag internal pressure can therefore be controlled via the outflow openings 22 and 24 as a function of the size of the occupant.

Figure 6A:
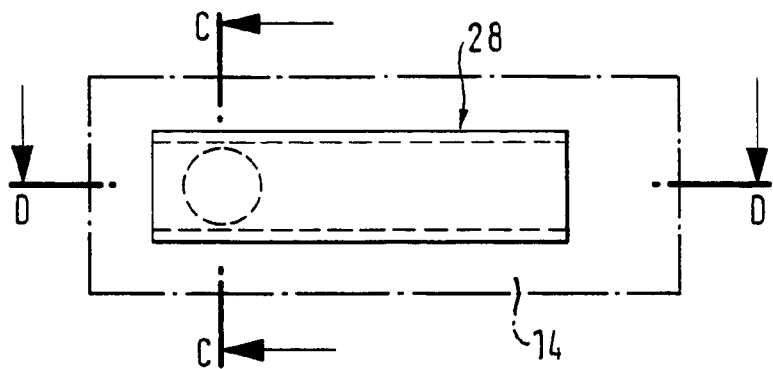
FIG. 6a shows a top view onto the gas bag in the region of the second outflow opening.
Figure 6B:
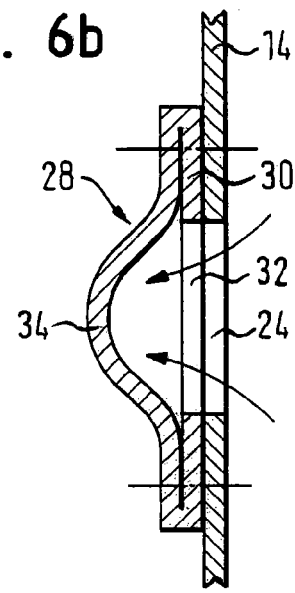
FIGS. 6b and 6c show sectional views along the lines C-C and D-D of FIG. 6a, respectively.
Figure 6C:
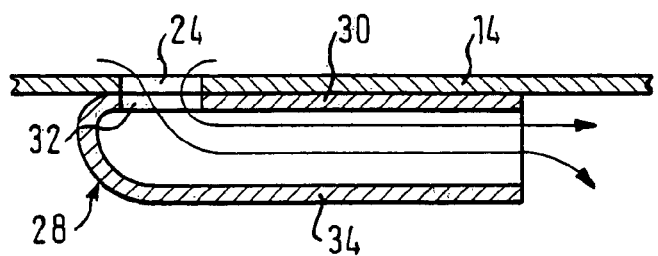

To protect the occupant from the gas emerging from the second outflow opening 24 facing the occupant, a deflection arrangement is provided, shown in FIGS. 6a to 6c, which lies at least partially in the region 26 and is formed from a fabric piece 28. A first section 30 of the fabric piece 28 lies directly over the outflow opening 24 and has an opening 32 corresponding to the outflow opening 24. A second section 34, connected with the first section 30, is folded over such that it covers the two openings 24 and 32. The fabric layers 30 and 34 are sewn on two opposite sides onto the outer wall of the gas bag 14, so that the gas can only emerge on one side (see FIG. 6c). This side is selected so that it points away from the occupant.

What is claimed is:

1. A side impact restraint device for protection of an occupant sitting on a vehicle seat (10) in a motor vehicle, the device being responsive to whether the occupant is a first occupant (20a) or a second occupant (20b), the second occupant (20b) being larger than the first occupant (20a), the device comprising:
    a gas bag (14), which unfolds between a lateral structure (12) of the vehicle and the occupant (20a; 20b),
    the gas bag (14) having an outflow opening (24) which is arranged in a region of the gas bag (14) facing the occupant, the vertical position of the outflow opening (24) being selected so that said outflow opening (24) is not covered by an upper body region of the first occupant (20a) but covered by-an upper body region of the second occupant (20b) in an inflated state of the gas bag (14) such that the gas bag (14) has an internal pressure controlled by the outflow opening (24) as a function of the size of the occupant, wherein the gas bag (18) unfolds out from the vehicle seat (10).

2. The side impact restraint device according to claim 1, wherein the outflow opening (24) is located in a region (26) which in relation to the hip joint region of the first and second occupants (20a; 20b) extends between a height ($h_1$) of 400 mm and a height ($h_2$) of 550 mm.

3. The side impact restraint device according to claim 1, wherein the gas bag (14) has a further outflow opening (22) which is arranged in a region of a lower section (18) of the gas bag (14) not facing the occupant (20a; 20b).

4. The side impact restraint device according to claim 1, wherein the gas bag (14) in the inflated state, viewed in longitudinal direction of the vehicle, has an upper section (16) and a lower section (18) widened compared with the upper section (16), the lower section (18) extending solely above the hip joint region of the first and second occupants (20a; 20b).

5. A side impact restraint device for protection of an occupant sitting on a vehicle seat (10) in a motor vehicle, the device being responsive to whether the occupant is a first occupant (20a) or a second occupant (20b), the second occupant (20b) being larger than the first occupant (20a), the device comprising:
    a gas bag (14), which unfolds between a lateral structure (12) of the vehicle and the occupant,
    the gas bag (14) having an outflow opening (24) which is arranged in a region of the gas bag (14) facing the occupant, the vertical position of the outflow opening (24) being selected so that said outflow opening (24) is not covered by an upper body region of the first occupant (20a), wherein an arrangement for deflecting the ouflowing gas is provided at the outflow opening (24).

6. The side impact restraint device according to claim 5, wherein the arrangement comprises a fabric piece (28) arranged on the outer side of the gas bag (14) over the outflow opening (24).

7. The side impact restraint device according to claim 6, wherein the fabric piece (28) comprises a first fabric section (30) lying directly over the outflow opening (24), the first fabric section (30) having an opening (32) corresponding to the outflow opening (24), and a second fabric section (34) covering the outflow opening (24) and the opening (32) formed in the first fabric section (30), the second fabric section (34) being fastened on the first fabric section (30) so that the gas emerging through the outflow opening (24) can only escape on a side facing away from one of the first and second occupants (20a; 20b).

8. The side impact restraint device according to claim 5, wherein the gas bag (14) in the inflated state, viewed in longitudinal direction of the vehicle, has an upper section (16) and a lower section (18) widened compared with the upper section (16), the lower section (18) extending solely above the hip joint regions of the first and second occupants (20a; 20b).

9. The side impact restraint device according to claim 5, wherein the outflow opening (24) is located in a region (26) which in relation to the hip joint region of the first and second occupants (20a; 20b) extends between a height ($h_1$) of 400 mm and a height ($h_2$) of 550 mm.

10. The side impact restraint device according to claim 5, wherein the gas bag (14) has a further outflow opening (22) which is arranged in a region of a lower section (18) of the gas bag (14) not facing the first and second occupants (20a; 20b).

* * * * *